(12) United States Patent
Martens et al.

(10) Patent No.: US 9,273,601 B2
(45) Date of Patent: Mar. 1, 2016

(54) CHARGING DEVICE

(75) Inventors: Anatolij Martens, Eislingen (DE); Florian Rentz, Stuttgart (DE); Jochen Schaeflein, Stuttgart (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 239 days.

(21) Appl. No.: 13/823,075

(22) PCT Filed: Aug. 29, 2011

(86) PCT No.: PCT/EP2011/064815
§ 371 (c)(1),
(2), (4) Date: May 28, 2013

(87) PCT Pub. No.: WO2012/034843
PCT Pub. Date: Mar. 22, 2012

(65) Prior Publication Data
US 2013/0247563 A1    Sep. 26, 2013

(30) Foreign Application Priority Data
Sep. 17, 2010  (DE) .......................... 10 2010 040 986

(51) Int. Cl.
| | |
|---|---|
| F02D 23/00 | (2006.01) |
| F02B 47/04 | (2006.01) |
| F01D 17/16 | (2006.01) |
| F02B 37/18 | (2006.01) |

(52) U.S. Cl.
CPC ............... *F02B 47/04* (2013.01); *F01D 17/16* (2013.01); *F02B 37/186* (2013.01); *F05D 2220/40* (2013.01); *Y02T 10/144* (2013.01)

(58) Field of Classification Search
CPC ...................................................... F02B 37/186
USPC ........ 60/602; 92/13.8, 140; 74/837, 99 R, 42, 74/47; 464/110, 124; 251/298, 299
See application file for complete search history.

(56) References Cited

U.S. PATENT DOCUMENTS

| | | | | |
|---|---|---|---|---|
| 2,833,511 | A | * | 5/1958 | Fletcher ......................... 251/218 |
| 3,153,988 | A | * | 10/1964 | Warstler .......................... 92/119 |
| 3,276,816 | A | * | 10/1966 | Edwards ......................... 297/359 |
| 4,368,609 | A | * | 1/1983 | Hutchinson et al. ........... 56/221 |
| 5,353,902 | A | * | 10/1994 | Flowtow et al. ............. 192/84.6 |
| 5,723,829 | A | * | 3/1998 | Inomata et al. ............... 181/254 |
| 8,701,408 | B2 | * | 4/2014 | Dettmann et al. .............. 60/602 |

(Continued)

FOREIGN PATENT DOCUMENTS

| | | |
|---|---|---|
| DE | 102010006966 A1 | 7/2011 |
| DE | 102010018740 A1 * | 11/2011 |

(Continued)

OTHER PUBLICATIONS

English Translation of JP 2003148107 A.*
(Continued)

*Primary Examiner* — Thomas Denion
*Assistant Examiner* — Jessica Kebea
(74) *Attorney, Agent, or Firm* — Fishman Stewart PLLC

(57) ABSTRACT

A charging device may include an actuating device for actuating a control device. The actuating device may be coupled to the control device via an actuating rod. The actuating rod may be coupled to the control device via a guide piece rotatably mounted at two points in an outer actuator lever.

14 Claims, 1 Drawing Sheet

(56) References Cited

U.S. PATENT DOCUMENTS

| | | |
|---|---|---|
| 2003/0196435 A1 | 10/2003 | Heath |
| 2005/0050888 A1 | 3/2005 | McEwan |
| 2005/0087171 A1* | 4/2005 | Lown .......................... 123/323 |
| 2007/0234720 A1* | 10/2007 | Wilson et al. ................... 60/602 |
| 2009/0014674 A1* | 1/2009 | Grissom et al. ............... 251/298 |
| 2009/0277171 A1* | 11/2009 | Fledersbacher et al. ........ 60/602 |
| 2009/0293654 A1 | 12/2009 | Pintauro |
| 2013/0305712 A1* | 11/2013 | Langohr ......................... 60/602 |
| 2014/0037433 A1* | 2/2014 | Hadas et al. .................. 415/148 |
| 2014/0119896 A1* | 5/2014 | Koch ........................... 415/148 |

FOREIGN PATENT DOCUMENTS

| | | |
|---|---|---|
| EP | 0119306 A2 | 9/1984 |
| JP | 2003148107 A * | 5/2003 |

OTHER PUBLICATIONS

English abstract for DE-102010006966.

German Serach Report for DE102010040986.3 mailed Aug. 29, 2011.

* cited by examiner a.)   b.)   c.)

CHARGING DEVICE

CROSS-REFERENCE TO RELATED APPLICATIONS

This application claims priority to German Patent Application 10 2010 040 986.3 filed on Sep. 17, 2010, and International Patent Application PCT/EP2011/064815 filed on Aug. 29, 2011, both of which are hereby incorporated by reference in their entirety.

TECHNICAL FIELD

The present invention relates to a charging device in particular an exhaust gas turbocharger, having an actuating device for actuating a control device. The invention additionally relates to an actuator lever having a rotatably mounted guide piece.

BACKGROUND

From US 2005/0050888 A1, a generic charging device in the manner of an exhaust gas turbocharger is known, having an actuator device for actuating a wastegate valve. The actuating device in this case is coupled to the wastegate valve via an actuating rod and connected to the housing of the charging device via a suitable holding device. Guidance of the actuating rod in this case is effected at a single point through a housing of the actuator device.

Charging devices having for example a variable turbine geometry or a wastegate valve are usually equipped with an electric or pneumatic actuator, which brings about the actuation of the aforementioned components. The actuator or the actuating device is actuated via an engine control and thus actuates an actuating rod which substantially moves axially. The actuating rod in this case acts on an actuator lever, which converts the translatoric movement of the actuating rod into a rotatoric movement and thereby controls the variable turbine geometry or the wastegate valve. The rotation of the actuation lever in this case is transmitted to the variable turbine geometry or the wastegate valve via an actuator shaft. The bearing point between the actuating rod and the actuator lever in this case has a major influence on the friction and thus the hysteresis. Furthermore, the setting or adjustment of the actuator device relative to the exhaust gas turbocharger takes place via an adjusting device between the actuating rod and the actuator lever. With known systems, a guide piece is unilaterally mounted in the actuator lever in this case, as a result of which as a consequence of actuating forces, which the actuating device transmits to the actuator lever via the actuating rod, a tilting and thus a friction between the guide piece and the actuator lever can occur.

SUMMARY

The present invention deals with the problem of stating an improved or at least an alternative embodiment for a charging device of the generic type, which is characterized in particular by a simple setting and a low-friction operation.

According to the invention, this problem is solved through the subjects of the independent claims. Advantageous embodiments are subject of the dependent claims.

The present invention is based on the general idea of providing a mounting of a guide piece on an actuator lever no longer unilaterally, but bilaterally, i.e. at at least two points, as a result of which a particularly smooth mounting of the guide piece in the actuator lever can be achieved and because of this a tilting and accompanying jamming of an actuating rod can be avoided. The actuating rod in this case is coupled to an actuating device which is usually employed for actuating a control device, in particular a variable turbine geometry or a wastegate valve with a charging device, for example with an exhaust gas turbocharger. The actuating device is thus coupled to the control device via the actuating rod. According to the invention, this actuating rod is now coupled to the control device via a guide piece that is rotatably mounted in the actuator lever at two points, as a result of which because of the bilateral mounting a tilting of the guide piece and accompanying stiff adjustability can be avoided. Compared with the unilateral mounting known from the prior art, the bilateral mounting provided according to the invention thus constitutes a clear improvement of the ease of operation, wherein this clear improvement can be achieved with marginal constructional and financial means.

With an advantageous further development of the solution according to the invention, the actuator lever is designed fork-like with two tines, wherein the guide piece is rotatably mounted between the two tines. To this end, the two tines usually have to bearing eyes, in which the guide piece is rotatably mounted. The two tines thus give the actuator lever a Y-like or fork-like shape, wherein the actuator lever on its side facing the two tines is connected to an adjustor shaft in a rotationally fixed manner With the actuator lever designed fork-like according to the invention, a bilateral and thus particularly easy-to-operate mounting of the guide piece between the two tines of the actuator lever can be achieved, as a result of which altogether a tilting of the guide piece relative to the actuator lever can be reliably avoided and thus an easy-to-operate adjustability can be guaranteed in the long term.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves, without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

Here it shows, in each case schematically.

DETAILED DESCRIPTION

Figure 1:
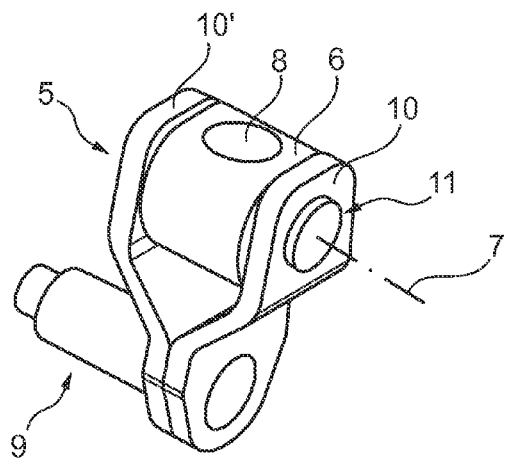
FIG. 1 an actuator lever according to the invention in a view.
Figure 2:
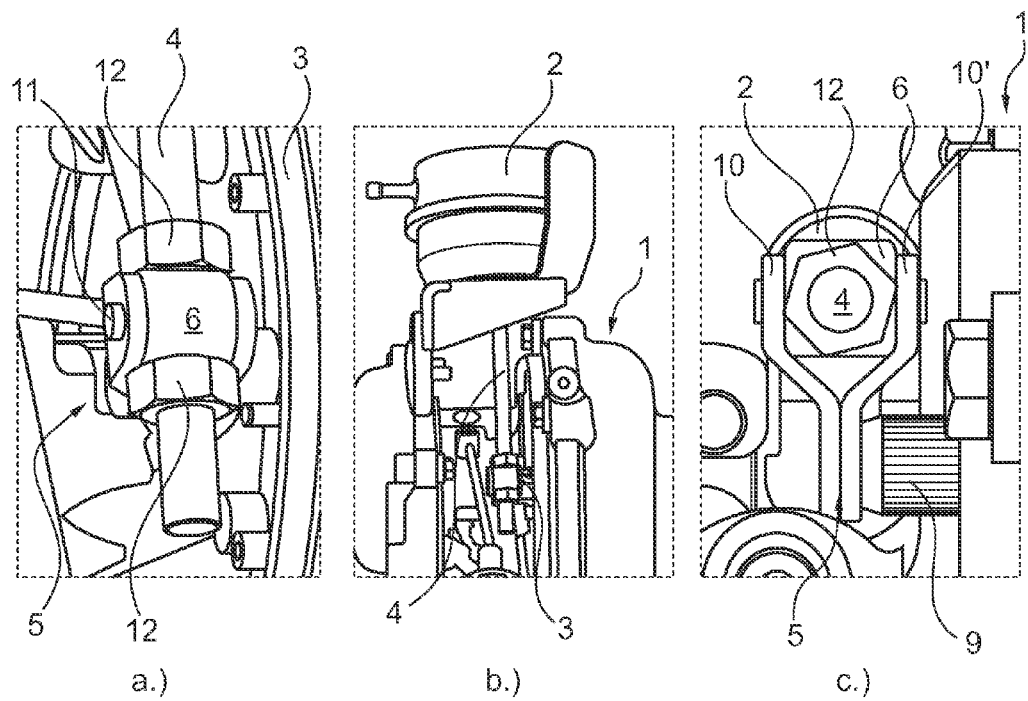
FIGS. 2a to 2c the actuator lever shown according to FIG. 1 in an installation situation on a charging device.

According to FIG. 2, a charging device 1 according to the invention, which for example can be designed as exhaust gas turbocharger, comprises an actuating device 2 for actuating a control device 3, in particular for actuating a variable turbine geometry or a wastegate valve. The adjusting device 2 in this case is coupled to the control device 3 via an adjusting rod 4, wherein the adjusting rod 4 according to the invention is coupled to the control device 3 via a guide piece 6 that is rotatably mounted at two points in an actuator lever 5 (see also FIG. 1). By way of the bilateral mounting of the guide piece 6 on the actuator lever 5, a particularly easy-to-operate and in particular tilting-proof mounting can be achieved. Compared with guide pieces or adjusting rods previously mounted merely unilaterally, this constitutes a clear improvement which on the other hand can be achieved cost-effectively and with merely minor constructional effort.

The guide piece 6 has a through-opening 8 running orthogonally to its axis of rotation 7, though which is the actuating rod 4 engages. On the one end, the actuator lever 5 is connected to an adjustor shaft 9 of the control device 3 in a rotationally fixed manner and on the other end rotatably connected to the guide piece 6.

Viewing FIG. 1 it is evident that the actuator lever 5 is designed fork-like and comprises two tines 10 and 10', wherein the guide piece 6 is rotatably mounted between both these tines 10 and 10'. To this end, the two tines 10 and 10' have bearing eyes, in which the guide piece 6 engages with suitable bearing pins 11. According to FIG. 1 it is evident that the two tines 10 and 10' of the actuator lever 5 designed fork-like are joined at their end assigned to the adjustor shaft 9 and interconnected, in particular welded together. In order to be able to fix the actuating rod 4 in axial direction with respect to the through-opening 8 in this case, the actuating rod 4 can for example have a thread adjacent to the region of the through-opening 8, on which corresponding nuts 12 (see FIG. 2a to c) are arranged. Through these nuts, an adjustment of the actuating rod 4 with respect to the actuator lever 5 is possible at the same time.

With the actuator lever 5 according to the invention, a particularly simple settability, i.e. adjustability, is thus possible, wherein on the other hand through the two-position mounting of the guide piece 6 on the actuator lever 5 an easy-to-operate mounting can be guaranteed in the long term.

The invention claimed is:

1. A charging device, comprising: an actuating device for actuating a control device, wherein the actuating device is coupled to the control device via an actuating rod, and further wherein the actuating rod is coupled to the control device via a guide piece rotatably mounted at two points in an actuator lever such that the actuating rod is rotatable with respect to the actuator lever;
   wherein the guide piece defines a through-opening configured to receive the actuating rod, and the actuating rod is fixed in an axial direction with respect to the through-opening in operation; and
   wherein the actuator lever has two separate tines each having an end assigned to an adjustor shaft of the control device, the two tines being joined and interconnected to each other at their respective ends to form a Y-shape, the guide piece being rotatably mounted between the two tines.

2. The charging device according to claim 1, wherein the through-opening runs orthogonally to its axis of rotation.

3. The charging device according to claim 1, wherein the actuator lever at one end is connected to the adjustor shaft of the control device in a rotationally fixed manner and at the other end is rotatably connected to the guide piece.

4. The charging device according to claim 1, wherein the actuating rod has a thread adjacent to the region of the through-opening to enable the actuating rod to be fixed in the axial direction with respect to the through-opening via nuts adjacent to the through-opening.

5. The charging device according to claim 2, wherein the actuator lever at one end is connected to the adjustor shaft of the control device in a rotationally fixed manner and at the other end is rotatably connected to the guide piece.

6. The charging device according to claim 1, wherein the actuating rod is fixed in an axial direction with respect to the through-opening.

7. The charging device according to claim 5, wherein the actuating rod has a thread adjacent to the region of the through-opening to enable the actuating rod to be fixed in the axial direction with respect to the through-opening via nuts adjacent to the through-opening.

8. The charging device according to claim 2, wherein the actuating rod has a thread adjacent to the region of the through-opening to enable the actuating rod to be fixed in the axial direction with respect to the through-opening via nuts adjacent to the through-opening.

9. The charging device according to claim 1, wherein the guide piece has an axis of rotation between the tines.

10. An actuator lever, comprising: a rotatably mounted guide piece for coupling an actuator device to a control device with a charging device, wherein the actuating device is coupled to the control device via an actuating rod, and further wherein the actuating rod is coupled to the control device via a guide piece rotatably mounted at two points within the actuator lever such that the actuating rod is rotatable with respect to the actuator lever;
    wherein the guide piece defines a through-opening configured to receive the actuating rod, and the actuating rod is fixed in an axial direction with respect to the through-opening in operation; and
    wherein the actuator lever has two separate tines each having an end assigned to an adjustor shaft of the control device, the two tines being joined and interconnected to each other at their respective ends to form a Y-shape, the guide piece being rotatably mounted between the two tines.

11. The actuator lever according to claim 10, wherein the through-opening runs orthogonally to its axis of rotation.

12. The actuator lever according to claim 10, wherein the actuator lever at one end is connected to the adjustor shaft of the control device in a rotationally fixed manner and at the other end is rotatably connected to the guide piece.

13. The actuator lever according to claim 10, wherein the actuating rod has a thread adjacent to the region of the through-opening to enable the actuating rod to be fixed in the axial direction with respect to the through-opening via nuts adjacent to the through-opening.

14. A charging device, comprising: an actuating device for actuating a control device, wherein the actuating device is coupled to the control device via an actuating rod, the actuating rod being coupled to the control device via a guide piece rotatably mounted at two points in an actuator lever such that the actuating rod is rotatable with respect to the actuator lever,
    wherein the actuator lever has two separate tines each having an end assigned to an adjustor shaft of the control device, the two tines being joined and interconnected to each other at their respective ends to form a Y-shape, the guide piece being rotatably mounted between the two tines with an axis of rotation between the at least two tines,
    wherein the guide piece defines a through-opening running orthogonally to its axis of rotation and configured to receive the actuating rod, and
    wherein the actuating rod has a thread adjacent to the region of the through-opening and is fixed in an axial direction with respect to the through-opening via nuts adjacent to the through-opening.

\* \* \* \* \*